United States Patent
Păbel

(10) Patent No.: US 8,784,018 B2
(45) Date of Patent: Jul. 22, 2014

(54) DRILLING TOOL OF THE LOOSE TOP TYPE

(75) Inventor: Helena Păbel, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1021 days.

(21) Appl. No.: 12/797,265

(22) Filed: Jun. 9, 2010

(65) Prior Publication Data

US 2010/0322727 A1    Dec. 23, 2010

(30) Foreign Application Priority Data

Jun. 23, 2009 (SE) .................................. 0900847-5

(51) Int. Cl.
*B23B 51/02* (2006.01)

(52) U.S. Cl.
USPC ........................... 408/230; 408/231; 408/233

(58) Field of Classification Search
USPC .......... 408/230, 231, 233, 232, 229, 227, 719
See application file for complete search history.

(56) References Cited

U.S. PATENT DOCUMENTS

| | | | |
|---|---|---|---|
| 5,904,455 A | 5/1999 | Krenzer et al. |
| 5,957,631 A | 9/1999 | Hecht |
| 6,059,492 A | 5/2000 | Hecht |
| 6,506,003 B1 | 1/2003 | Erickson |
| 6,601,486 B2 | 8/2003 | Hansson et al. |
| 6,623,202 B2 | 9/2003 | Hansson et al. |
| 6,783,307 B2 | 8/2004 | Lindblom |
| 6,783,308 B2 | 8/2004 | Lindblom |
| 6,840,717 B2 | 1/2005 | Eriksson |
| 6,899,495 B2 | 5/2005 | Hansson et al. |
| 7,114,892 B2 | 10/2006 | Hansson |
| 7,134,816 B2 | 11/2006 | Brink |
| 7,407,350 B2 | 8/2008 | Hecht et al. |
| 7,513,724 B2 | 4/2009 | Kakai |
| 7,611,311 B2 | 11/2009 | Kakai et al. |

(Continued)

FOREIGN PATENT DOCUMENTS

| | | |
|---|---|---|
| CN | 1160370 A | 9/1997 |
| CN | 1258240 A | 6/2000 |

(Continued)

OTHER PUBLICATIONS

Notification of First Office Action (with English translation) for Chinese Patent Application No. 201010217846.2, dated Aug. 23, 2013.

(Continued)

*Primary Examiner* — Christopher Besler
(74) *Attorney, Agent, or Firm* — Morgan, Lewis & Bockius LLP

(57) ABSTRACT

A drilling tool of the loose top type includes a basic body having two bendable branches having inner support surfaces that are resiliently pressable against side contact surfaces of a replaceable loose top. The mounting of the loose top is affected by turning-in from an initial position to an operative end position. An abutting edge along each side contact surface then bends out the branches and subjects the branches to a spring force that reaches a maximum in a dead position so as to then decrease somewhat up to the operative end position. During the final phase of the rotary motion, the operator obtains, in a tactile and/or auditory way, confirmation of the loose top indeed reaching its operative end position.

23 Claims, 13 Drawing Sheets

(56) References Cited

U.S. PATENT DOCUMENTS

| | | |
|---|---|---|
| 7,625,161 B1 | 12/2009 | Ruy Frota de Souza |
| 7,713,004 B2 | 5/2010 | Lehto et al. |
| 8,226,333 B2 | 7/2012 | Kakai et al. |
| 8,308,402 B2 | 11/2012 | Brink |
| 8,449,227 B2 | 5/2013 | Danielsson |
| 2007/0081872 A1 | 4/2007 | Blomstedt et al. |
| 2007/0081873 A1 | 4/2007 | Blomstedt et al. |
| 2008/0193237 A1 | 8/2008 | Men et al. |
| 2008/0193238 A1 | 8/2008 | Hecht |
| 2009/0116920 A1* | 5/2009 | Bae .............................. 408/227 |
| 2010/0254779 A1 | 10/2010 | Wedner |
| 2010/0322728 A1 | 12/2010 | Aare |
| 2010/0322729 A1 | 12/2010 | Päbel |
| 2010/0322731 A1 | 12/2010 | Aare |
| 2011/0110739 A1 | 5/2011 | Frisendahl |
| 2011/0236145 A1 | 9/2011 | Päbel et al. |

FOREIGN PATENT DOCUMENTS

| | | |
|---|---|---|
| CN | 1512927 A | 7/2004 |
| CN | 101048251 A | 10/2007 |
| DE | 4435857 A1 | 4/1996 |
| DE | 10 2007 044 095 A1 | 3/2009 |
| EP | 0 118 806 | 9/1984 |
| EP | 1 013 367 | 6/2000 |
| EP | 1 273 373 A1 | 1/2003 |
| JP | 2002-501441 | 1/2002 |
| JP | 2004-527391 | 9/2004 |
| JP | 2006-167871 | 6/2006 |
| WO | WO 2005/115667 | 12/2005 |
| WO | WO 2008/072840 A2 | 6/2008 |
| WO | WO 2009/128775 A1 | 10/2009 |

OTHER PUBLICATIONS

Notice of Reason for Rejections (with English translation) for Japanese Patent Application No. 2010-142832, dated Mar. 4, 2014.

* cited by examiner

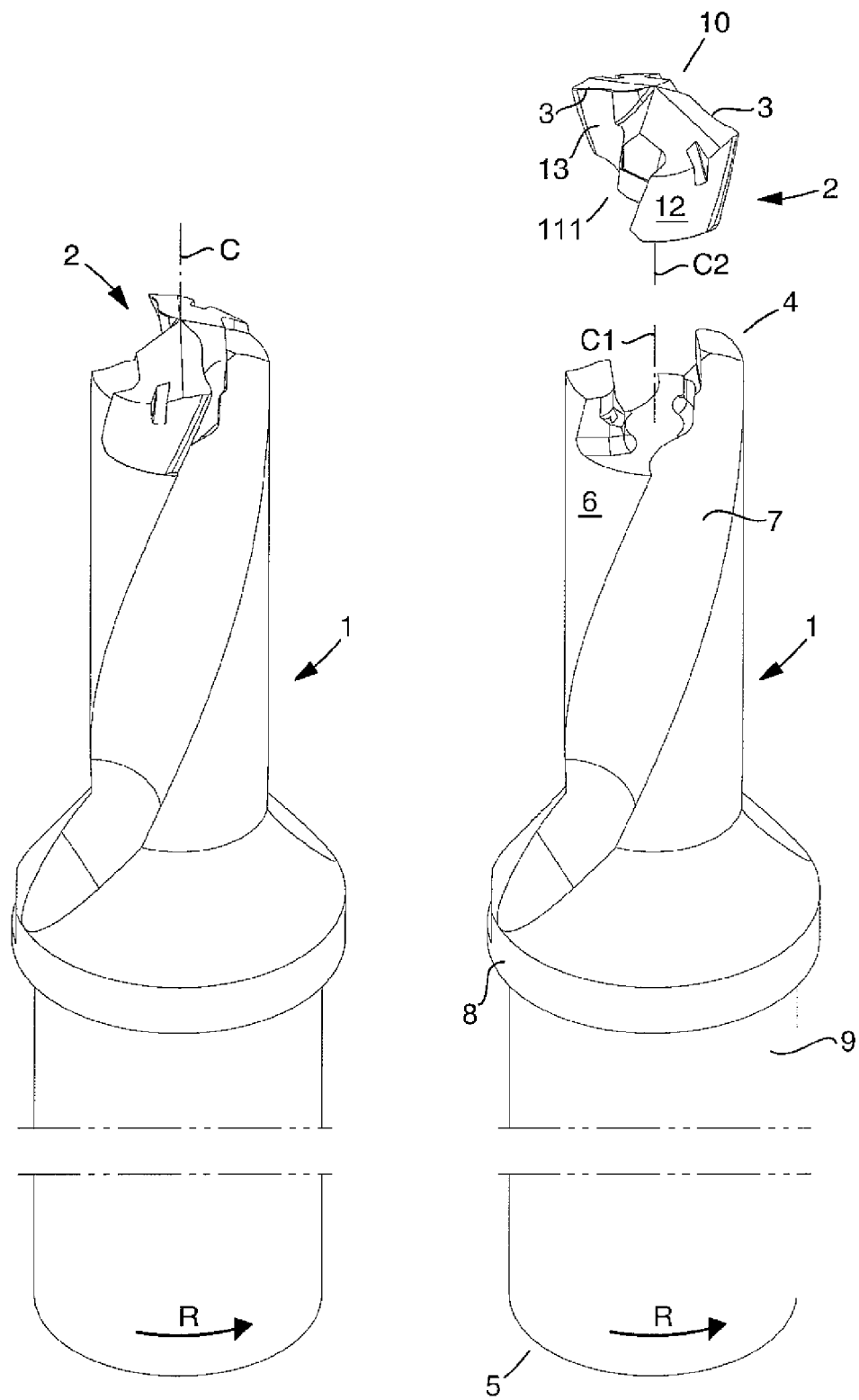

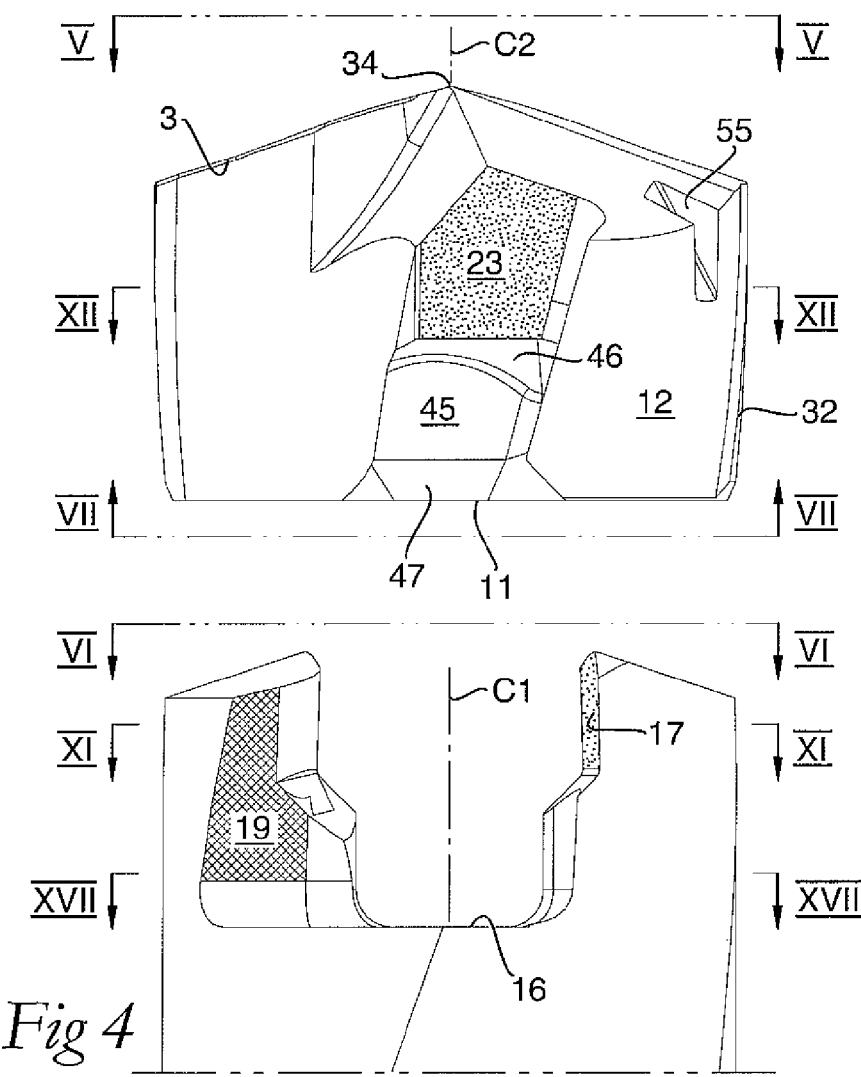
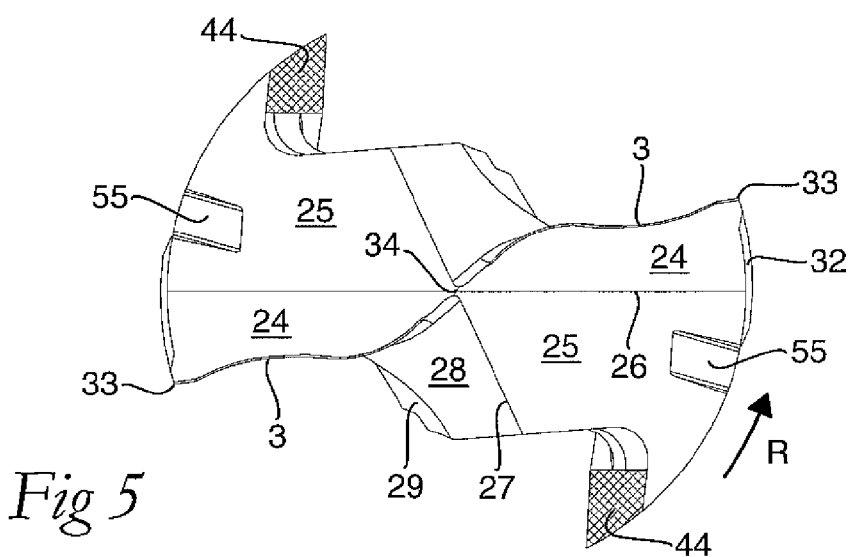

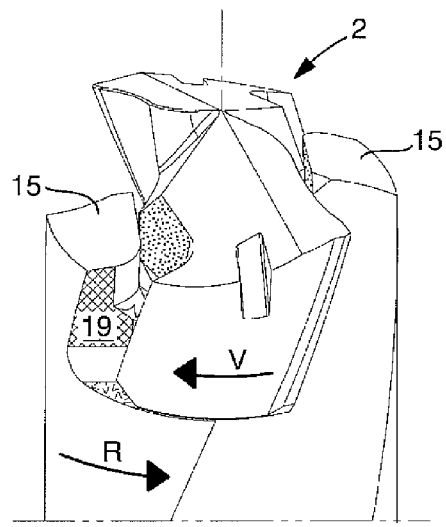
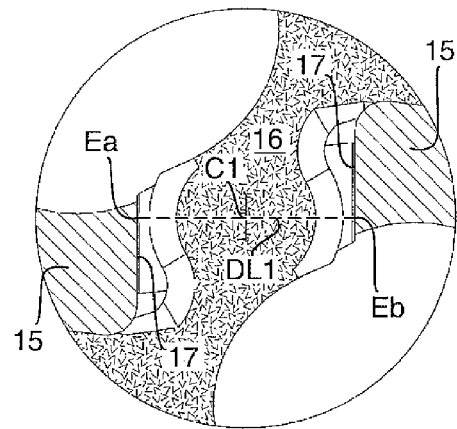
Fig 10        Fig 11
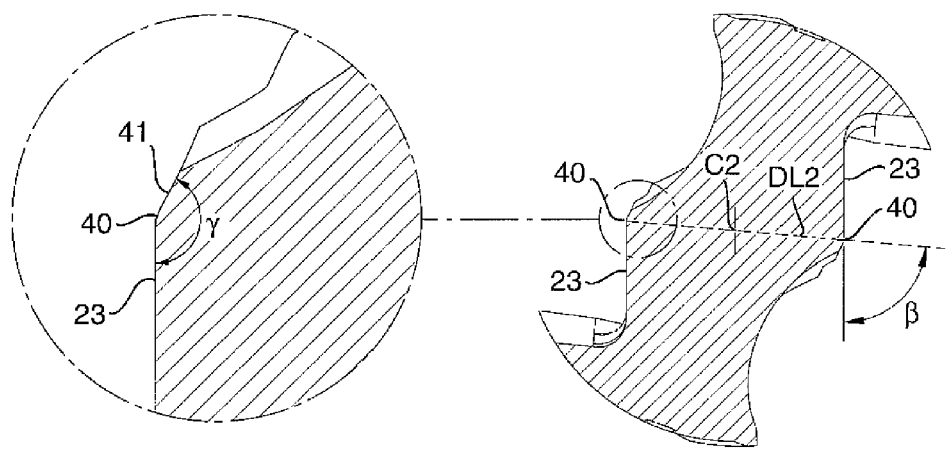
Fig 12

US 8,784,018 B2

DRILLING TOOL OF THE LOOSE TOP TYPE

CROSS-REFERENCE TO PRIOR APPLICATION

This application claims priority to Swedish Application No. 0900847-5 filed Jun. 23, 2009, which is incorporated by reference herein.

TECHNICAL FIELD

This disclosure relates to a drilling tool intended for chip removing machining and of the type that includes a basic body having front and rear ends, between which a first center axis extends around which the basic body is rotatable in a given direction of rotation. Further, the drilling tool includes a loose top having front and rear ends, between which a second centre axis extends. The front end of the loose top includes one or more cutting edges. The front end of the basic body includes a jaw between two axially protruding, peripherally situated branches that are elastically bendable and have the purpose of resiliently clamping the loose top in the jaw. Specifically, a pair of inner support surfaces of the branches resiliently presses against a pair of external side contact surfaces of the loose top. Further, the branches have the purpose of transferring torque to the loose top via tangential support surfaces of the branches and cooperating tangential contact surfaces of the loose top. The inner support surface of the individual branch extends between first and second, tangentially separated side borderlines. The first tangentially separated borderline is heading and the second tangentially separated borderline is trailing during rotation of the tool. The individual side contact surface extends between first and second side borderlines. The second side borderline is rotationally trailing and is included in an edge to a trailing part surface, besides which the loose top is axially insertable into the jaw and turnable into and out of an operative engagement with the branches.

Drilling tools of the kind in question are suitable for chip removing or cutting machining, especially hole making of workpieces of metal, such as steel, cast iron, aluminium, titanium, yellow metals, etc. The tools may also be used for the machining of composite materials of different types.

BACKGROUND ART

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Drilling tools have been developed that, contrary to solid drills, are composed of two parts, including a basic or drill body and a head detachably connected with the same and thereby being replaceable. The head includes the requisite cutting edges. In such a way, the major part of the tool can be manufactured from a comparatively inexpensive material having a moderate modulus of elasticity, such as steel, while a smaller part, the head, can be manufactured from a harder and more expensive material, such as cemented carbide, cermet, ceramics and the like, which gives the cutting edges a good chip-removing capacity, a good machining precision and a long service life. The head forms a wear part that can be discarded after wear-out, while the basic body can be re-used several times, for example, 10 to 20 replacements. A now recognized term for these cutting edge-carrying heads is "loose tops", which henceforth will be used in this document.

Loose top type drilling tools have a plurality of desired capabilities, one of which is that torque should be transferable in a reliable way from the rotatable, driven basic body to the loose top. Furthermore, the basic body should without problems be able to carry the rearwardly directed axial forces that the loose top is subjected to during drilling. Further, the loose top should be held centered in an exact and reliable way in relation to the basic body. Also, the loose top is clamped to the basic body not only during drilling of a hole, but also during retraction of the drilling tool out of the same. A user further desires that the loose top should be mountable and dismountable in a rapid and convenient way without the basic body necessarily having to be removed from the driving machine. In addition, the tool, and in particular the loose top manufactured from expensive materials, should be capable of low cost manufacture.

A loose-top tool intended for drilling and of the initially generally mentioned kind is previously known by EP 1013367. In this case, the two branches of the basic body are arranged to be turned into arched pockets, which are recessed in the rear part of convex envelope surfaces of two bars included in the loose top and separated by chip flutes, and which have a limited axial extension that in turn limits the maximally possible length of the branches. The internal support surfaces of the branches and the external side contact surfaces of the loose top, which are pressed against each other in order to resiliently and securely pinch the loose top in the jaw between the branches, have a rotationally symmetrical basic shape. The external side contact surfaces of the loose top generally have a larger diametrical dimension than the inner support surfaces of the branches in order to bend out the branches elastically or resiliently. In their angle-wise end position of turning, the rotationally heading, torque-transferring tangential support surfaces of the branches should be pressed into close contact against two tangential contact surfaces that form end surfaces in the two pockets in the loose top.

The tool of EP 1013367 is meritorious in several respects, one of which is that the axial support surface that is situated between the branches and forms a bottom in the jaw of the basic body does not need to be intersected by any slot or cavity in which chips could get caught. Another merit is that the loose top can be made fairly short in relation to its diameter, something that is material-saving and cost-reducing. In addition, the axial contact surface of the loose top as well as the axial support surface of the basic body extends between ends that are peripherally situated. In such a way, these surfaces become ample and thereby suitable to transfer great axial forces.

A disadvantage of the known tool is, however, that the mounting of the loose top in the jaw of the basic body risks becoming unreliable and cumbersome to carry out. Already when the two branches initially begin to be turned into the appurtenant pockets in the loose top, the branches are subjected to a clamping force that from then on becomes equally great during the entire rotary motion up to the end position in which the branches are pressed against the end surfaces of the pockets. Because the mounting is carried out in a manual way and the branches are held resiliently clamped against the side contact surfaces of the loose top by a force that is equally great during the entire rotary motion, it may become difficult for the operator to determine whether the loose top has reached its end position or not. This decision is made more difficult by the fact that the uniform clamping force has to be fairly great in order for the loose top to be clamped reasonably reliably. This means that the work with the turning-in becomes laborious, and therefore the operator, particularly when in a hurry, may unintentionally finish the turning-in too early, before the loose top has reached its end position in the jaw. Incorrect mounting of the loose top may, among other things, manifest itself in lost centering of the drilling tool in connection with the entering of a workpiece.

SUMMARY

The present disclosure aims at obviating the above-mentioned disadvantages of the known drilling tool and at providing an improved drilling tool. An object is accordingly to provide a drilling tool, in which the loose top and the cooperating jaw of the basic body are formed in such a way that the operator, in a tactile and/or auditory way, clearly perceives when the loose top reaches its end position during the turning-in. Another object is to provide a drilling tool, the loose top of which can be turned into the jaw of the basic body without the branches constantly subjecting the loose top to a great clamping force and thereby a great, uniform resistance during the entire turning-in operation. Still another object is to provide a drilling tool, the loose top of which is held reliably clamped in the jaw of the basic body, for example, by utilizing the inherent elasticity of the branches in such a way that an optimal grip on the loose top is provided. A further object is to provide a drilling tool, the loose top of which has a minimal length, and thereby a minimal volume, in relation to its diameter, all with the purpose of reducing the consumption of expensive material to a minimum in connection with the manufacture of the loose top. It is also an object to provide a drilling tool where the basic body can transfer great torques to the loose top. Still another object is to provide a drilling tool in which the loose top is centered and retains its centricity in an accurate way in relation to the basic body.

An aspect of the invention provides a drilling tool for chip removing machining, including a basic body having front and rear ends, between which a first center axis extends around which the basic body is rotatable in a given direction of rotation, and a loose top having front and rear ends, between which a second center axis extends, the front end including one or more cutting edges. The front end of the basic body comprises a jaw between two axially protruding, peripherally situated branches that are elastically bendable. The branches are capable of resiliently clamping the loose top in the jaw by inner support surfaces of the branches being resiliently pressed against external side contact surfaces of the loose top, and capable of transferring torque to the loose top via tangential support surfaces of the branches and cooperating tangential contact surfaces of the loose top. The inner support surface of the individual branch extends between first and second tangentially separated side borderlines, the first tangentially separated side borderline is heading and the second tangentially separated side borderline is trailing during rotation of the tool. The individual side contact surface extends between first and second side borderlines, the second side borderline that is rotationally trailing is included in an edge to a trailing part surface, besides which the loose top is axially insertable into the jaw and turnable into and out of an operative engagement with the branches. A second imaginary diametrical line, which extends perpendicular to the second center axis of the loose top between abutting edges that abut the second side borderline of each of the two side contact surfaces, has a length that is greater than the length of an analogous first diametrical line, which extends the shortest possible distance between the inner support surfaces when the branches are unloaded, and has opposite end points located at tangential distances from the first tangentially separated side borderline and the second tangentially separated side borderline of the respective inner support surface.

The side contact surfaces of the loose top with edges, in combination with a suitably selected distance between the inner support surfaces of the branches, upon the turning-in provides a successively increasing deflection of the branches up to a predetermined dead or intermediate position. At the predetermined dead or intermediate position the clamping force is maximal, so as to then decrease during the continued turning a short distance further until the end position is reached. During the final phase of the rotary motion between the dead position and the end position, the clamping force in the branches assists in rapidly bringing the loose top to the end position. This may manifest itself in either a tactile perception in the fingers of the operator or a click sound being audible to the ear, or a combination of these manifestations.

It is to be understood that both the foregoing general description and the following detailed description are exemplary and explanatory and are intended to provide further explanation of the invention as claimed.

BRIEF DESCRIPTION OF THE DRAWINGS

Particular embodiments of the invention will be described in more detail below, reference being made to the appended drawings, on which:

FIG. 1 is a sectioned perspective view showing the basic body and loose top of an embodiment of the drilling tool in the composed state, FIG. 2 is an exploded perspective view showing the drilling tool of FIG. 1 where the loose top is separated from the basic body, FIG. 4 is an exploded view showing the basic body and the loose top of FIG. 1 in side elevation, FIG. 5 is an end view V-V in FIG. 4 showing the front end of the loose top, FIG. 10 is a partial perspective view showing the loose top of FIG. 1 inserted into the jaw of the basic body of FIG. 1 in a state when the turning-in of the same is to be started, FIG. 11 is a section XI-XI in FIG. 4, FIG. 12 is a cross section XII-XII in FIG. 4, FIGS. 13-16 are a series of pictures showing the different positions of the loose top of FIG. 1 in connection with the turning-in of the same into the jaw of the basic body.

DETAILED DESCRIPTION OF PREFERRED EMBODIMENTS

Figure 3:
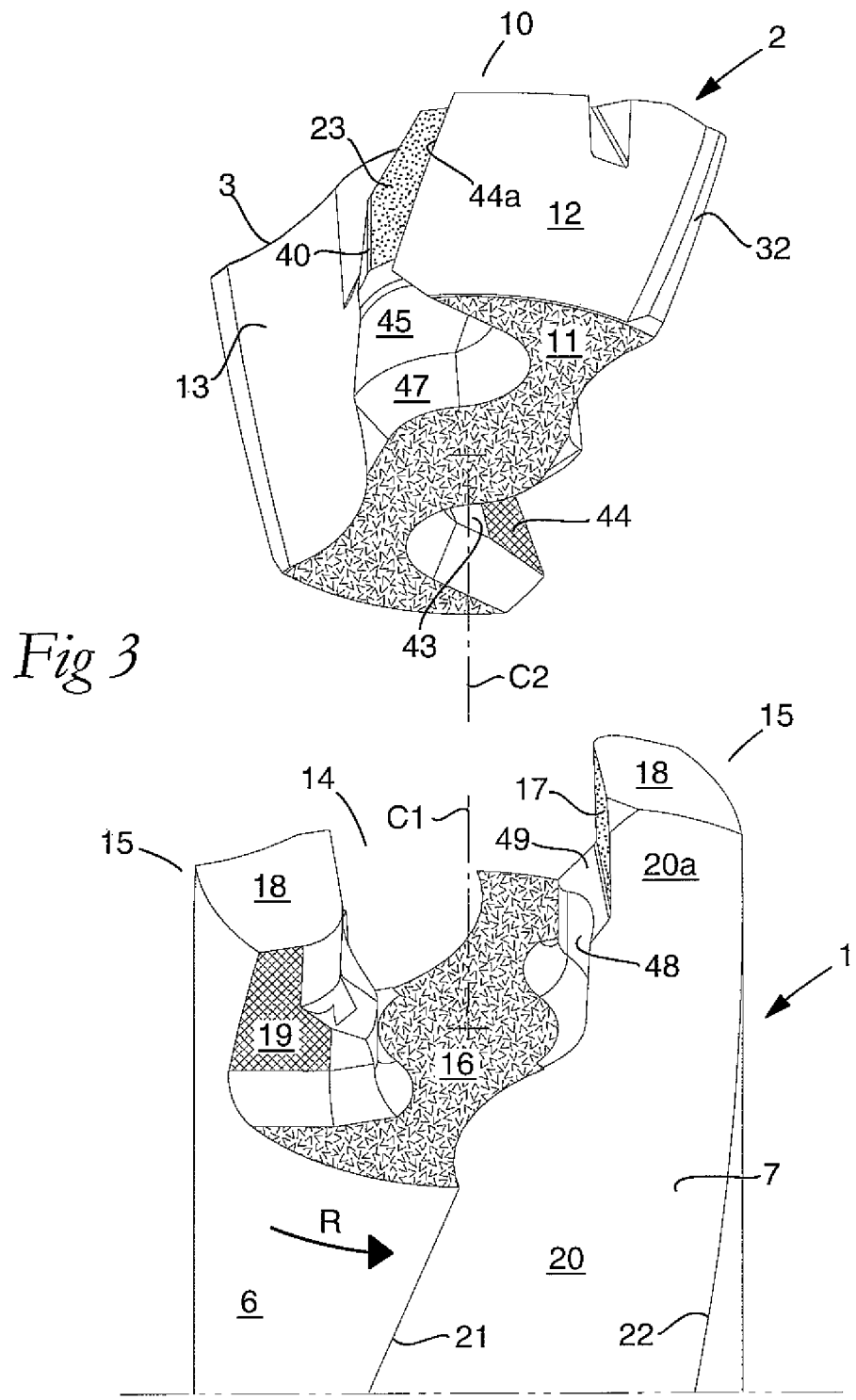
FIG. 3 is an enlarged exploded view showing the drilling tool of FIG. 1 where the loose top is shown in a bottom perspective view and the front end of the basic body is shown in a top perspective view.

In the following description and the claims, a number of cooperating pairs of surfaces of the basic body and the loose top, respectively, will be described. When these surfaces are present on the basic body, the surfaces are denominated "support surfaces", while the corresponding surfaces of the loose top are denominated "contact surfaces" (for example, "axial support surface" and "axial contact surface", respectively). Furthermore, it should be pointed out that the loose top includes a rear end in the form of a plane surface, which in the example serves as an axial contact surface for pressing against an axial support surface in the basic body. Depending on the context, this surface will be denominated either "rear end" or "axial contact surface". Furthermore, an inner support surface of a branch and a side contact surface of the loose top are defined by a pair of side borderlines, one of which moves ahead of the other one during rotation. The borderlines are denominated "heading" and "trailing", respectively, in order not to be mistaken for the concepts "front" and "rear". In the drawings, the cooperating surfaces contacting each other in the operative state of the drilling tool are shown by similar surface patterns.

The drilling tool shown in FIGS. 1 and 2 is in the form of a so-called twist drill and includes a basic body 1 as well as a loose top 2 in which the requisite cutting edges 3 are included. In its composed, operative state according to FIG. 1, the drilling tool is rotatable around a center axis indicated by C, more precisely in the direction of rotation R.

In FIG. 2, it is seen that the basic body 1 includes front and rear ends 4, 5, between which a centre axis C1 specific to the basic body extends. In the backward direction from the front end 4, a cylindrical envelope surface 6 extends, in which two chip flutes 7 are countersunk that in this embodiment are helicoidal, but that also could be straight as in tap borers. In the example, the chip flutes 7 end in the vicinity of a collar 8 included in a rear part 9 that is intended to be attached to a driving machine (not shown).

Also the loose top 2 includes front and rear ends 10, 111 and a center axis C2 with which two parts 12 of an envelope surface are concentric. The envelope part surfaces 12 are separated by two helicoidal chip flute sections 13 (see also FIG. 3), which form extensions of the chip flutes 7 of the basic body 1 when the loose top is mounted onto the basic body. If the loose top 2 is centered correctly in relation to the basic body 1, the individual centre axes C1 and C2 coincide with the centre axis C of the composed drilling tool.

Reference is now made to FIG. 3 and other drawing figures. In FIG. 3, it is seen that the basic body 1 in the front end thereof includes a jaw 14 that is delimited between two identical branches or shanks 15 and an intermediate bottom that forms an axial support surface 16 for the loose top. Each branch 15 includes an inner support surface 17 that extends axially rearward from a front end surface 18 of the branch. Furthermore, the individual branch 15 includes a tangential support surface 19 that is facing forward in the direction of rotation, and thus is heading. An opposite, trailing tangential support surface 20a is included as a front part of the concave surface 20 that is present between two helicoidal borderlines 21, 22 and delimits the chip flute 7. In a known way, the individual branch 15 is elastically bendable to be resiliently clampable against the loose top 2. This is realized by the fact that the material in at least the front portion of the basic body 1 has a certain inherent elasticity, for example, lower modulus of elasticity than the material in the loose top 2. The material in at least the front portion can include steel. The material in the loose top may, in a traditional way, include cemented carbide, which is hard carbide particles in a binder metal, cermet, ceramics or the like. Advantageously, the axial support surface 16 is plane and extends perpendicular to the center axis C1. In addition, the axial support surface 16 extends diametrically between the two part surfaces that together form the envelope surface 6. Generally the axial support surface has a §-like contour shape.

As is further seen in FIG. 3, the rear end of the loose top is represented by an axial contact surface 11 that, like the axial support surface 16, can be plane and extends perpendicular to the center axis C2. The axial contact surface 11 extends between diametrically opposed envelope part surfaces 12 and has a §-like contour shape. Furthermore, the loose top 2 includes a pair of external, diametrically opposed side contact surfaces 23, against which the inner support surfaces 17 of the branches can be resiliently clamped. In certain embodiments, the contour shape of the surfaces 11 and 16 is identical, whereby complete surface contact is established in the operative state of the tool.

The front end 10 of the loose top 2, in which the cutting edges 3 are included, is represented by an end surface that is composed of a plurality of part surfaces (see FIGS. 5 and 8), which in this embodiment are identical in pairs and therefore not described individually. Behind the individual cutting edge 3, as viewed in the direction of rotation, a primary clearance surface 24 is formed, which has a moderate clearance angle and transforms into a secondary clearance surface 25 having a greater clearance angle, via a borderline 26. Via an additional borderline 27, the secondary clearance surface 25 transforms into a third clearance surface 28, which in turn, via an arched borderline 29, transforms into a chip flute 13. As may be best seen in FIG. 8, the concave surface 30 that delimits the chip flute section 13 extends partly up to the individual cutting edge 3 and forms a chip surface for the cutting edge 3. In the chip surface of the cutting edge, also a convex part surface 31 is included. The design of the front end of the loose top may be modified in miscellaneous ways and is therefore incidental provided that the loose top can carry out chip removing machining.

Furthermore, it should be observed that adjacent to the envelope part surface 12, a guide pad 32 (see FIGS. 3 and 5) is formed, the main task of which is to guide the drilling tool. The diameter of the drilled hole is determined by the diametrical distance between the peripheral points 33 where the cutting edges 3 meet the guide pads 32. Also the two cutting edges 3 converge into a tip 34, which forms the very foremost part of the loose top, and in which there may be included a so-called chisel edge and a minimal centering punch (lack designations).

Figures 8, 9:
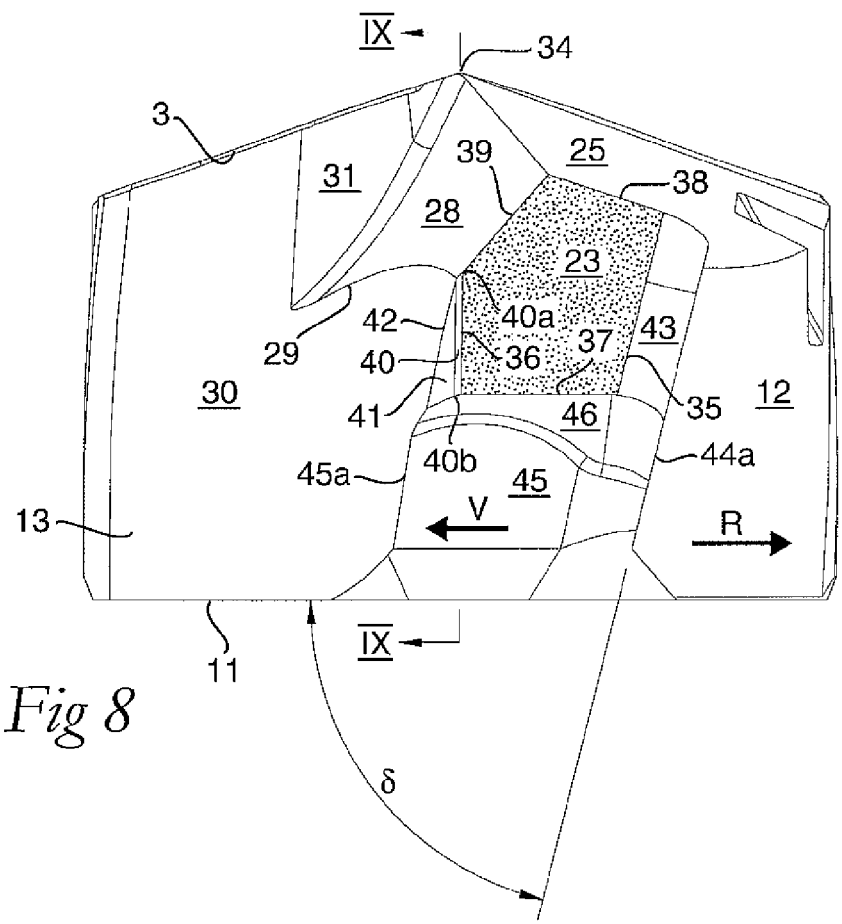
FIG. 8 is an enlarged side view of the loose top of FIG. 1.
FIG. 9 is a cross section IX-IX in FIG. 8.

Reference is now made to FIG. 8, from which it is seen that the individual side contact surface 23 of the loose top 2 is laterally delimited between first and second side borderlines 35, 36, the first side borderline 35 is heading and the second side borderline 36 is trailing during rotation of the tool. Rearward (downward in the drawing), the side contact surface 23 is delimited by a transverse, rear borderlines 37, while its front limitation includes two oblique borderlines 38, 39, the first oblique borderline borders on the secondary clearance surface 25 and the second oblique borderline borders on the third clearance surface 28. The second side borderline 36 is included in (or forms) an edge, designated 40, that constitutes a transition between the side contact surface 23 and a rotationally trailing part surface 41. Although it is feasible to form the edge 40 sharp, most embodiments manufacture the edge 40 as a radius transition, including, for example a convexly rounded, long narrow surface in the transition between the side contact surface 23 and trailing part surface 41. Also, the trailing part surface 41 in this embodiment is wedge-shaped and borders on the trailing chip flute surface 30. In particular, the trailing part surface 41 is delimited between the edge 40 and an acute borderline 42 that forms an acute angle with the edge 40. The edge 40 and the acute borderline 42 diverge in the backward direction.

At the first side borderline 35 thereof, the side contact surface 23 transforms into a concave recess surface 43 that in turn borders on a tangential contact surface 44 (see FIG. 3), against which the individual branch 15 is pressed, in order to transfer torque to the loose top.

In the illustrated embodiment, the side contact surfaces 23, like the inner support surfaces 17 of the branches 15, are essentially plane. As is further seen from the cross section in FIG. 9, the two opposite side contact surfaces 23 of the loose top 2 diverge at a certain angle α in the direction from the rear end toward the front end. In the reference plane RP1, which is situated on a level with the front end 40a of the edge 40, the loose top has accordingly a width W1 that is somewhat greater than the width W2 in the reference plane RP2, which is situated on a level with the rear borderline 37 of the side contact surface. The difference between the width measures W1 and W2 can be very moderate, where the angle of divergence α is small. In the illustrated embodiment, W1 is about 8.00 mm and W2 is about 7.97 mm, the angle α is about 0.86° (α/2=0.43°). Although this angle of divergence is diminutive, the angle is, however, fully sufficient for bending out the branches 15 so much that the branches subject the loose top to a considerable clamping force.

In this connection, it should be pointed out that the angle of divergence α may vary upward as well as downward from about 0.86°. However, the angle of divergence α should amount to at least about 0.20° and at most about 2°. In certain embodiments, the angle of divergence α should be within the range of 0.60-1.20°. The size of the angle α depends on the axial length of the inner support surface 17 and side contact surface 23. Specifically, the angle should be adapted to the length of the surfaces in such a way that surface contact is attained in the operative state of the loose top.

Because the side contact surfaces 23 diverge in the way described above, the front end 40a of the edge 40 is located at a greater radial distance from the center axis C2 of the loose top than the rear end 40b of the edge 40. In other words, the front end 40a will first contact the inner support surface 17 of the individual branch in connection with the turning-in of the loose top into the jaw 14. Also, the edge 40 in this embodiment is straight.

Figure 20:
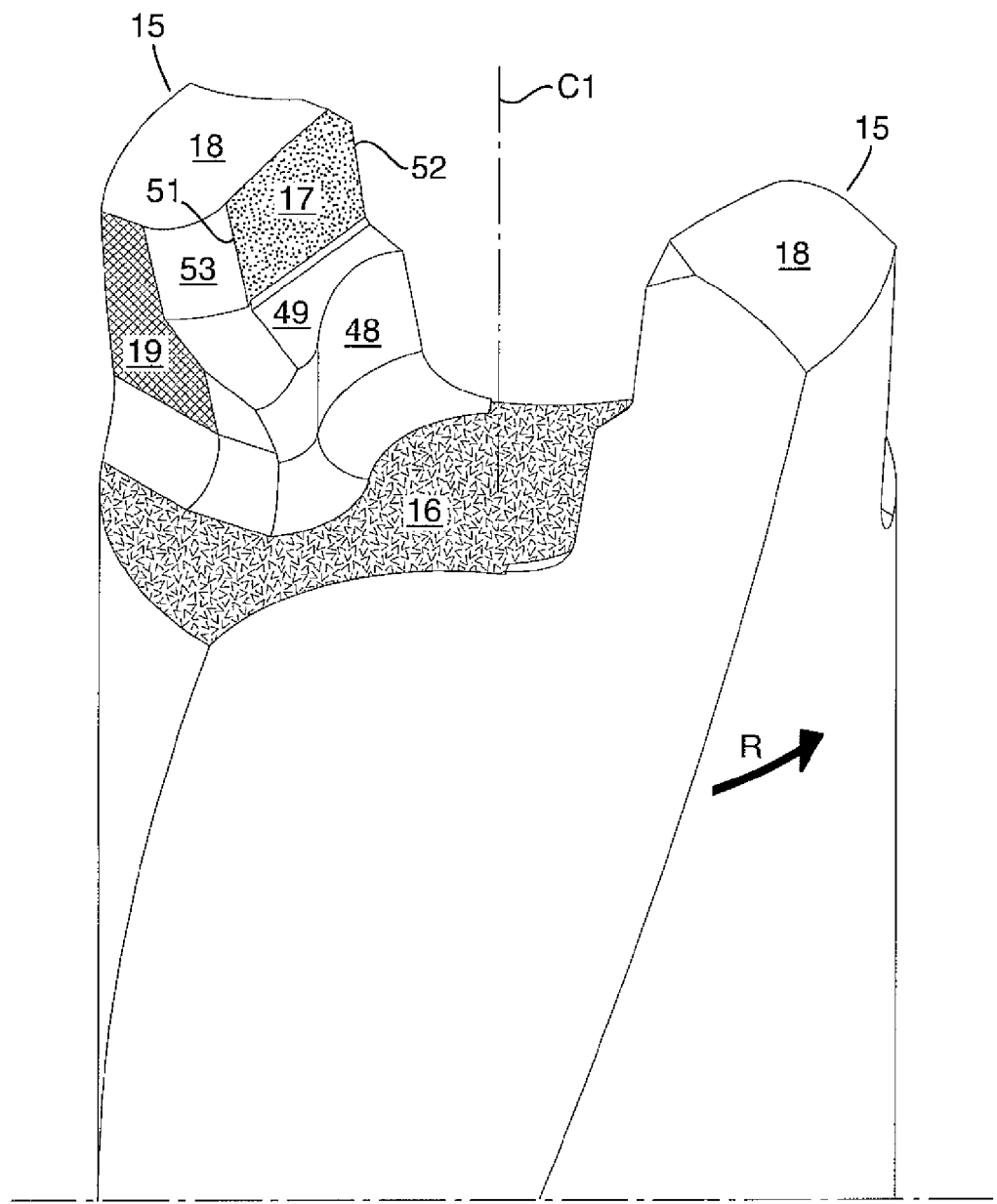
FIG. 20 is an enlarged perspective view of the jaw of the basic body of FIG. 1.

Reference is now made to FIG. 20, which shows that the inner support surface 17 of the individual branch 15, like the cooperating side contact surface 23 of the loose top, is delimited between first and second side borderlines 51, 52. The first borderline 51 is heading and the second borderline 52 is trailing during rotation. Between the inner support surface 17 and the tangential support surface 19, there is a concave clearance surface 53 having a radius that is greater than the radius of the recess surface 43.

Figure 7:
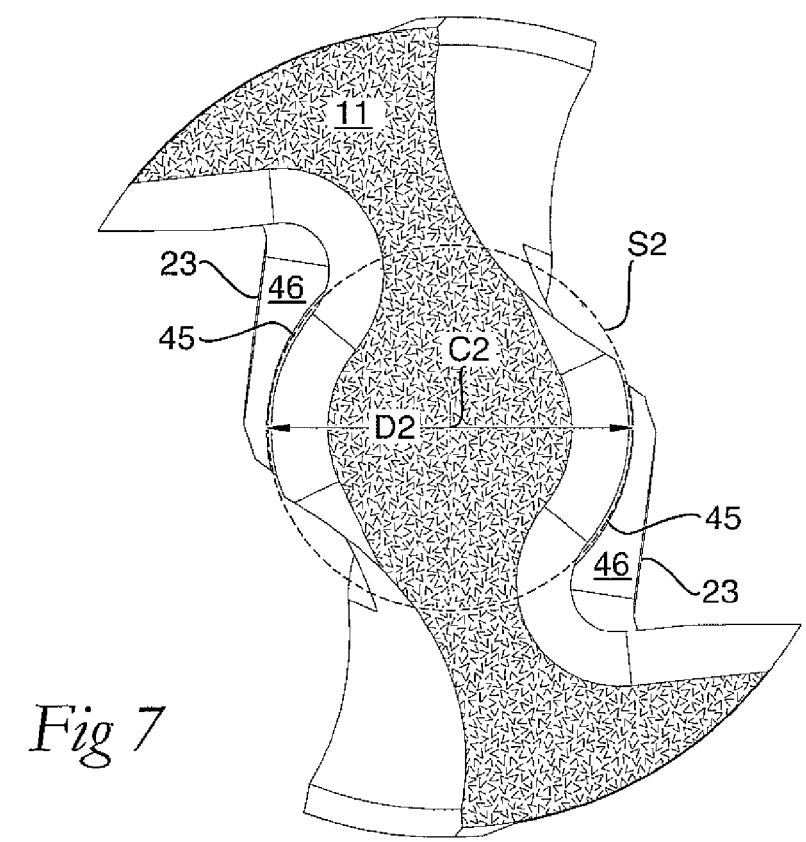
FIG. 7 is an end view VII-VII in FIG. 4 showing the loose top from behind.

In FIG. 10, the loose top 2 is shown in an initial position in which the loose top has been inserted axially into the jaw between the branches 15, but has not been turned into its operative end position. In order to coarse-center or provisionally retain the loose top in a reasonably, but not exactly, centered position during the subsequent turning-in, the rear part of the loose top and the inner parts of the branches are formed with cooperating guide surfaces. Each side contact surface 23 (see FIGS. 3 and 4) transforms into a convex guide surface 45 being axially behind via an intermediate surface 46. Between the guide surface 45 and the axial contact surface 11 of the loose top, a clearance surface 47 is present. As is seen in FIG. 7, the two guide surfaces 45, which are formed on diametrically opposed sides of a central portion of the loose top, have a rotationally symmetrical shape. The surfaces follow a circle S2, the diameter of which is designated D2. The circle S2, and thereby also the surfaces 45, are concentric with the centre axis C2 of the loose top. In the illustrated embodiment, the surfaces 45 are cylindrical, although they could also be conical.

Figure 6:
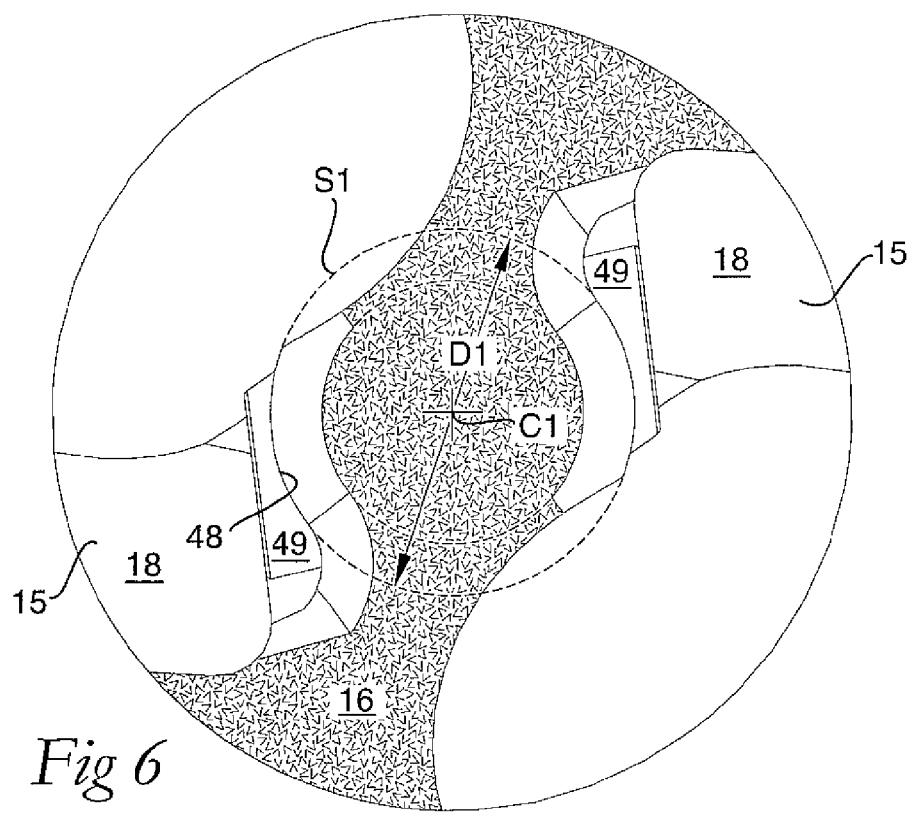
FIG. 6 is an end view VI-VI in FIG. 4 showing the basic body from the front.

As is seen in FIG. 3, in combination with FIGS. 6 and 20, the two branches 15 are, at the rear ends thereof, formed with a pair of concave, internal guide surfaces 48, which cooperate with the convex, external guide surfaces 45 of the loose top. Each such guide surface 48 transforms into an inner support surface 17 via an intermediate surface 49, which is inclined in the inward/rearward direction from the inner support surface 17. Also the two internal guide surfaces 48 are cylindrical, or alternatively conical, and are defined by an imaginary circle S1 (see FIG. 6), the diameter of which is designated D1. The diameter D1 of the circle S1 is somewhat greater than the diameter D2 of the circle S2, which means that the guide surfaces 45, 48 do not contact each other when the loose top is operatively clamped in the jaw of the basic body. The difference in diameter may in practice amount to one or a few tenth of a millimeter. However, it is guaranteed that the loose top is coarse centered and retains an approximate intermediate position between the branches during the turning-in that is carried out from the initial position shown in FIG. 10. The fact that the diameters D1 and D2 are differently great means that the guide surfaces 45, 48 do not impose requirements of dimensional accuracy in connection with the manufacture.

The guide surface 45 (see FIG. 8) is partially displaced in the tangential direction in relation to the side contact surface 23, in such a way that the borderline 45a to the chip flute 13 is displaced rearward in the direction of rotation R in relation to the limiting edge 40 of the side contact surface, which is toward the left in FIG. 8. During the turning-in of the loose top in the turning direction V, the borderline 45a will therefore move before the limiting edge 40. The practical consequence of this will be that the guide surfaces 45 can start to co-operate with the guide surfaces 48 with the purpose of provisionally coarse centering the loose top already before the limiting edges 40 get in contact with the inner support surfaces 17 of the branches 15.

Reference is now made to FIG. 11, in which DL1 designates a straight, first diametrical line that intersects the centre axis C1 and extends the shortest possible distance between the inner support surfaces 17 of the branches 15 facing each other, and forms a right angle with the inner support surfaces. The ends of this shortest possible diametrical line DL1 are designated Ea, Eb. It is evident that any other imaginary diametrical line (lacks designation) drawn between the inner support surfaces 17 and intersecting the centre axis C1 becomes longer than the shortest diametrical line DL1. This applies irrespective of whether the imaginary, longer diametrical line is turned clockwise or counter-clockwise around C1 in relation to the diametrical line DL1 shown in FIG. 11.

In FIG. 12, DL2 designates a second, likewise straight diametrical line that extends between the edges 40 of the two opposite side contact surfaces 23 and intersects the centre axis C2 of the loose top. The diametrical line DL2 extends between the front end points 40a of the edges 40 (see FIG. 8). The individual side contact surface 23 forms an acute angle with the diametrical line DL2. In the example, the angle β amounts to about 85°. In certain embodiments, the angle β amounts to at least about 75° and at most about 88°. In yet more certain embodiments, the angle amounts are within the range of 80-86°. From the enlarged detailed section in FIG. 12, it is furthermore seen that the side contact surface 23 and the trailing part surface 41 form an obtuse angle γ with each other. In the example, γ amounts to about 152°. By the fact that the angle γ is obtuse, rather than acute, which would also be feasible, the portion of the loose top that surrounds the edge 40 will become robust and endure forces that act against the edge.

Figure 13:
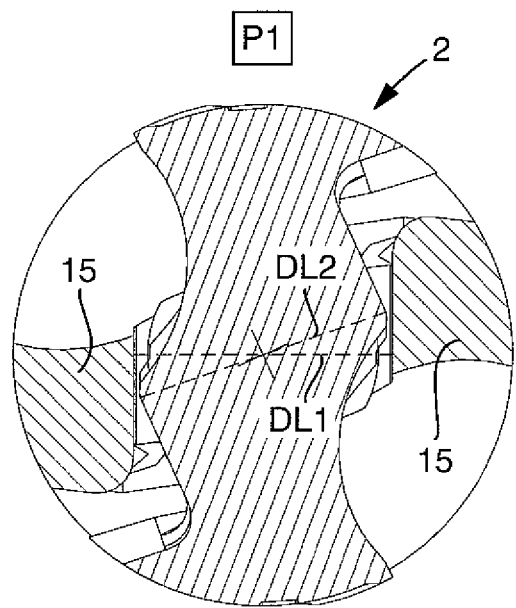
Figure 14:
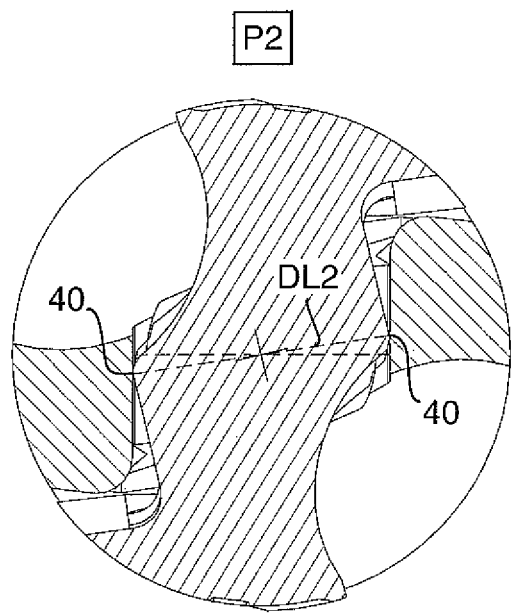
Figure 15:
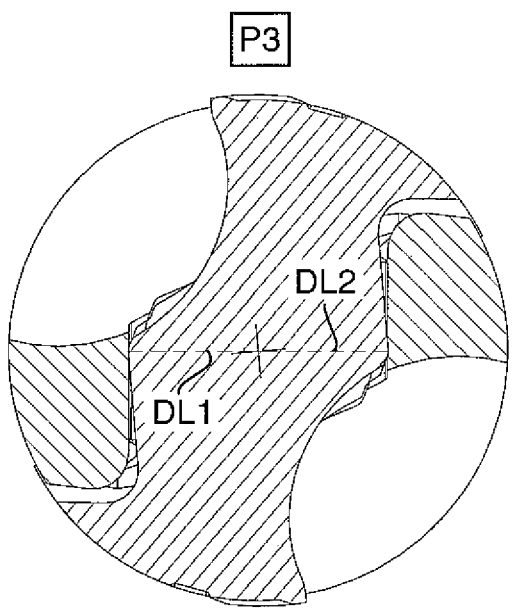
Figure 16:
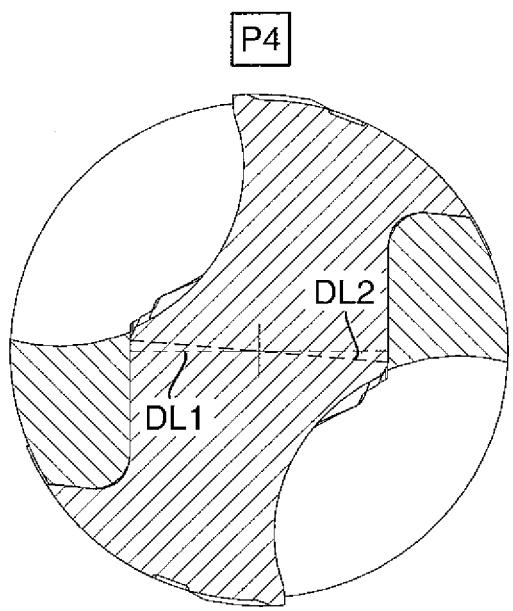

In certain embodiments, the diametrical line DL2 is somewhat longer than the diametrical line DL1. Because the length difference is small, for example, some hundredths of a millimeter, and not visible to the naked eye, reference is now made to the series of pictures in FIGS. 13-16, as well as to the enlarged, schematic picture in FIG. 19. In FIG. 13, the loose top 2 is shown in an initial position P1 according to FIG. 10. FIG. 13 shows how the loose top in this position can be freely inserted axially into the jaw by the fact that the side contact surfaces thereof have no contact with the branches 15. In this position, the convex guide surfaces 45 of the loose top are partially located between the concave guide surfaces 48 of the branches 15. In a first step, the loose top is turned into the position P2 according to FIG. 14, where the two opposite edges 40 get in contact with the inner support surfaces of the branches. After further turning, the loose top 2 reaches the position P3 shown in FIG. 15 where the diametrical lines DL1 and DL2 coincide. In this position, the edges 40 have reached a dead or intermediate position, in which the clamping force of the branches 15 is maximal. From this dead position P3, the loose top is turned further a short distance to reach its end position P4 according to FIG. 16. In this position, the edges 40 have passed the dead position P3 according to FIG. 15, but without the spring force or tensile capacity of the branches 15 having been exhausted. In the end position P4 according to FIG. 16, the side contact surfaces 23 abut against the inner support surfaces 17 at the same time as the torque-transferring tangential support surfaces 19 of the branches are pressed in close contact against the tangential contact surfaces 44 of the loose top.

Figure 19:
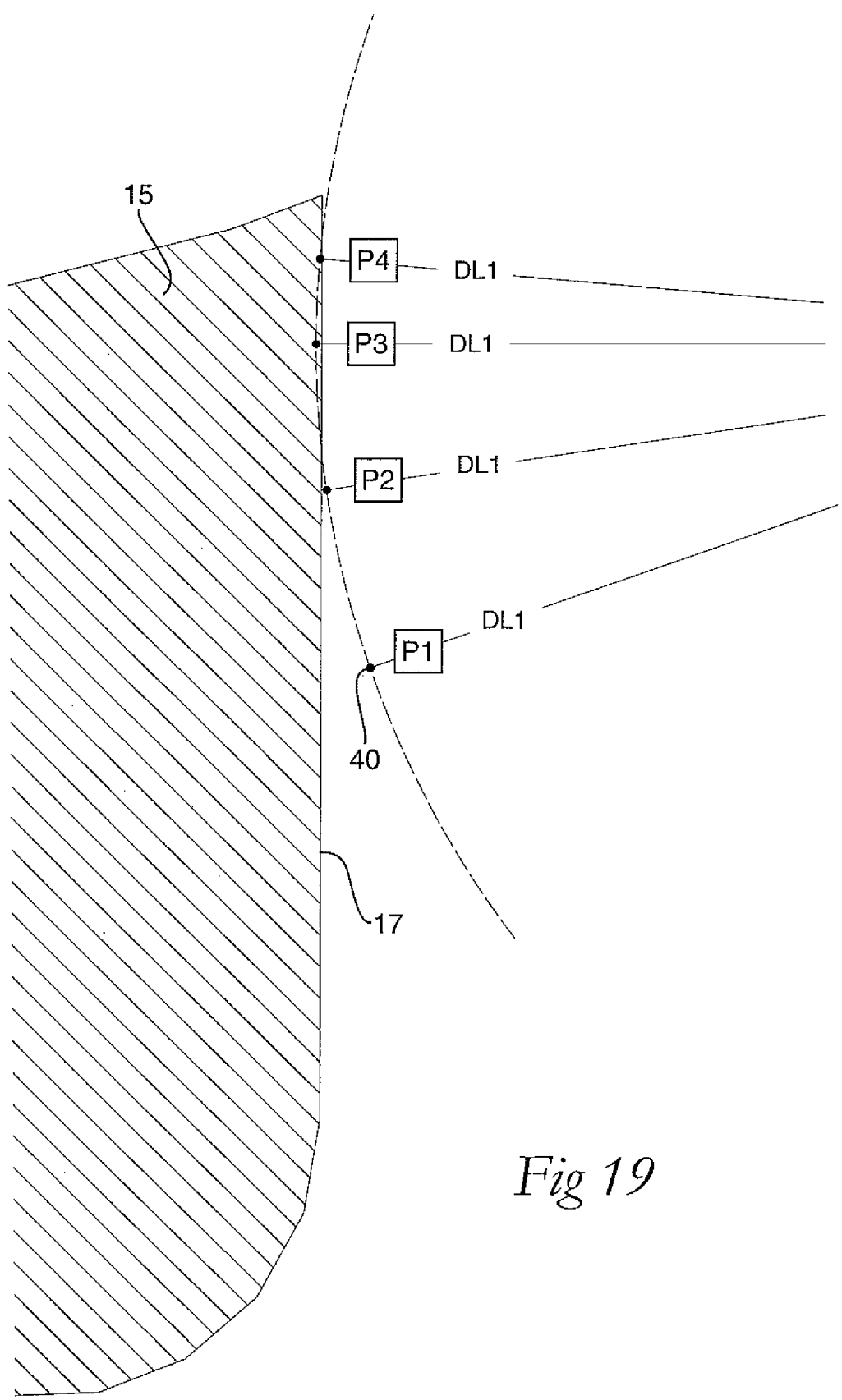
FIG. 19 is an extremely enlarged, schematic picture showing different positions of the edge of the loose top of FIG. 1 that bends out a cooperating branch.

In FIG. 19, the different positions of the edge 40 in relation to the individual branch 15 are illustrated more clearly. In the position P1 according to FIG. 13, the edge 40 lacks all contact with the inner support surface 17 of the branch. In the position P2, contact has been established with the inner support surface 17. From this position and on, the edge 40 of the loose top starts to bend out the branch 15 while applying a successively increasing clamping force to the loose top. In the dead position P3 according to FIG. 15, the clamping force in the branch has grown to a maximum, because here, the diametrical lines DL1 and DL2 coincide. In order to reach its end position P4, the loose top is turned further a short distance clockwise around the centre axis C1. During the comparatively short move between the positions P3 and P4, when the edge 40 has passed the dead position P3, the continued turning of the loose top will entirely or partly be overtaken by the branches 15 as a consequence of the fact that the clamping force in the branches now aims to bring the loose top to the end position in which it no longer can be turned further as a consequence of the fact that the pairs of surfaces 23, 17 and 19, 44 are held pressed in close contact against each other. Practical tests carried out using the tool have shown that the concluding turning between the positions P3 and P4 is followed by a pronounced tactile sensation in the fingers of the operator, and at times an audible click sound, which confirms to the operator that the loose top has reached its operative end position.

The exact centering of the loose top in relation to the basic body is initiated in the position P2, when the edges 40 of the loose top first get in contact with the inner support surfaces 17 of the branches 15. As the edges are turned toward their end position P4, the centering will become increasingly distinct and exact as a consequence of the increasing clamping force in the branches. The branches 15 retain an ample clamping force in the end position P4, even if the clamping force to a certain extent has been reduced in relation to the maximal clamping force in the position P3. By suitably adjusting such geometrical factors as the amount of rotary motion between P3 and P4 in relation to the selected difference in length between DL1 and DL2, the clamping force in the operative end position can be predetermined. For instance, the clamping force in the end position P4 can be determined to 50% of the maximal clamping force in the dead position P3.

Figure 17:
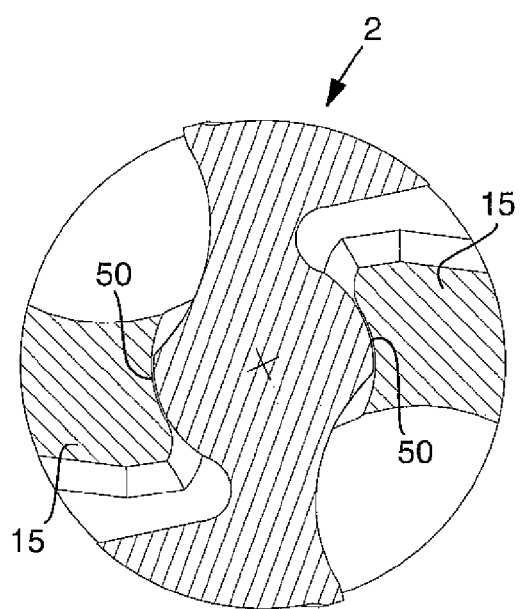
FIG. 17 is a cross section XVII-XVII in FIG. 4, the loose top being shown in an intermediate position between the branches.
Figure 18:
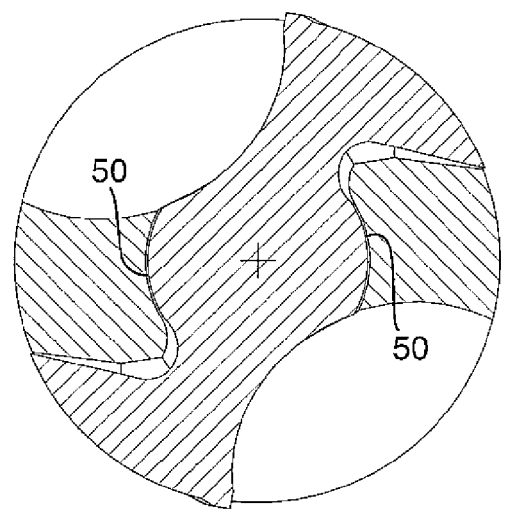
FIG. 18 is a cross section corresponding to FIG. 17 in which the loose top is shown in its end position of turning.

In FIGS. 17 and 18, it is illustrated how narrow, although pronounced slits 50 arise between the pairs of cooperating guide surfaces 45, 48 of the loose top 2 and of the branches 15, respectively, when the loose top is turned toward its operative end position.

Further, the drilling tool includes that the side contact surfaces 23 of the loose top 2 are situated near the front end 10 of the loose top, and that the corresponding inner support surfaces 17 of the branches 15 are situated far in front on the branches. Accordingly, the side contact surfaces 23 extend rearward from the two clearance surfaces 25, 28 that are included as part surfaces in the front end 10 of the loose top. In an analogous way, the inner support surfaces 17 of the branches extend rearward from the edge lines that form transitions to the front end surfaces 18 of the branches. By this location of the side contact surfaces and the inner support surfaces, respectively, there is provided a powerful grip or pinch along the front portion of the loose top adjacent to the cutting edges, because the branches have their greatest bending capacity, and thereby their optimal gripping capacity, in the area of the free, front ends thereof rather than in the vicinity of the rear ends.

In FIG. 8, 44a designates the straight borderline that forms a transition between the part envelope surface 12 and the tangential contact surface 44 of the loose top (see also FIG. 3). Said tangential contact surface 44 is inclined in relation to the axial contact surface 11 of the loose top at an angle δ, which in the example amounts to about 76°. The tangential support surface 19 (see FIGS. 10 and 20) that cooperates with the individual tangential contact surface 44 is correspondingly inclined. By this inclination of the respective surfaces, a locking element is provided that, in combination with the pinching effect of the branches 15, counteracts unintentional axial retraction of the loose top out of the jaw 14, for example, in connection with the retraction of the drilling tool out of a drilled hole. The angle δ may vary upward as well as downward. In certain embodiments the angle amount is at least about 65° and at most about 85°.

In FIGS. 4 and 5, it is seen that the loose top 2 includes a key grip in the form of a pair of peripherally situated notches or seats 55.

Embodiments of the invention enable the operator to obtain an apparent confirmation of the loose top having reached its operative end position during the turning-in. Further, the resistance of the bendable branches to the turning-in is not constantly great, but maximal only during the short moment when the edges are turned past the dead position. Furthermore, the inherent elasticity of the branches assumes entirely or partly the final turning-in from the dead position to the end position during the final phase of the rotary motion. In other words, the risk that the operator, for example, when in a hurry, unintentionally fails to finish the manual turning all the way up to the absolute end position is counteracted. Additionally, the loose top is securely pinched between the front ends of the branches, where the branches are most bendable and give an optimal clamping force. Furthermore, the loose top may be given a minimal volume in relation to its diameter, whereby the consumption of expensive material in the same is reduced to a minimum. Yet further, the basic body can transfer considerable torques to the loose top because the tangential support surfaces of the branches can be given an optimized length within the scope of the available axial length of the loose top. Furthermore, the loose top can be mounted and dismounted in a simple way with use of a simple key. In addition, the two side contact surfaces of the loose top are well exposed and easy to access if the two side contact surfaces would need to be ground in order to guarantee good centering.

Figure 21:
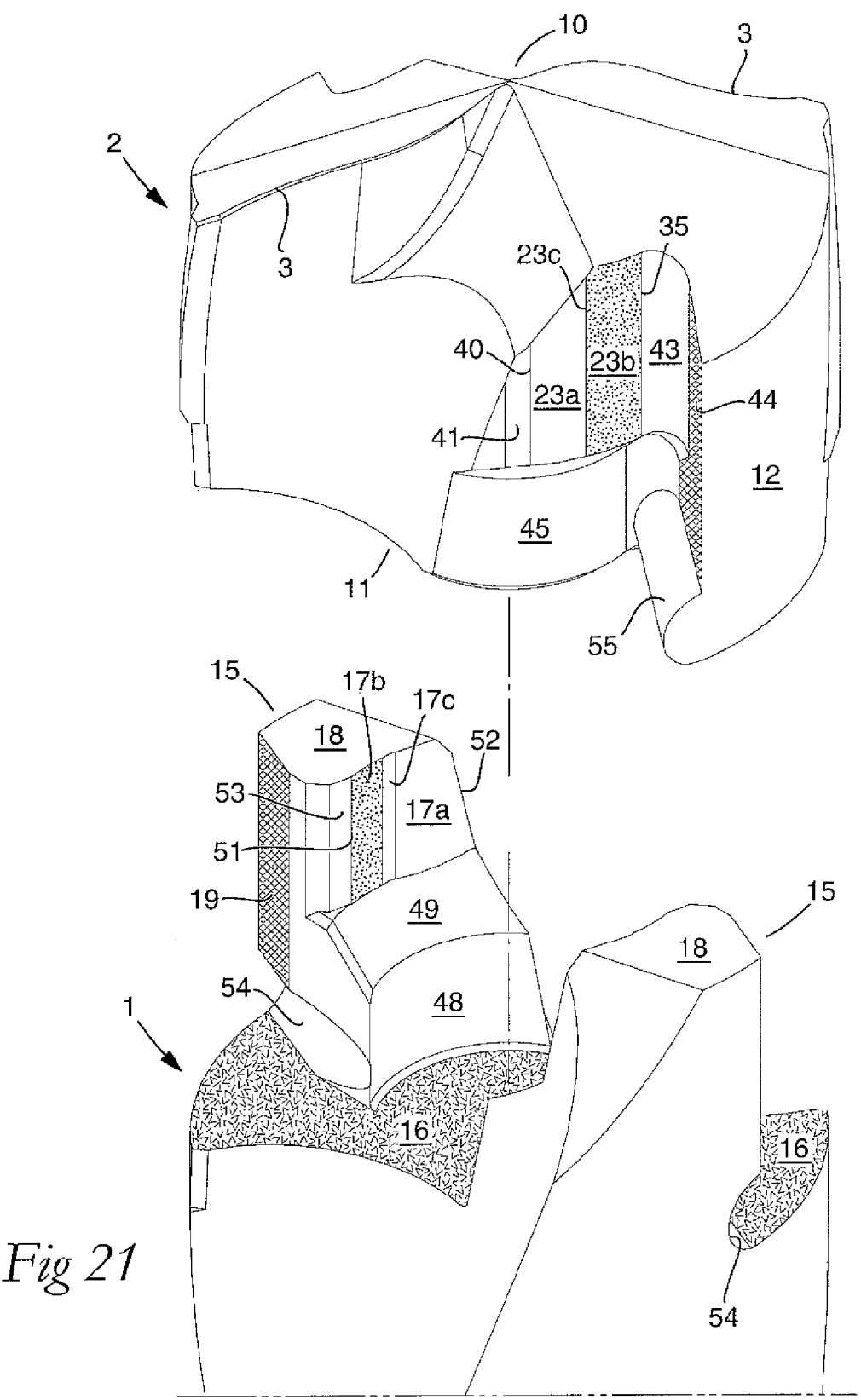
FIG. 21 is a perspective exploded view illustrating an alternative embodiment of the invention.
Figure 22:
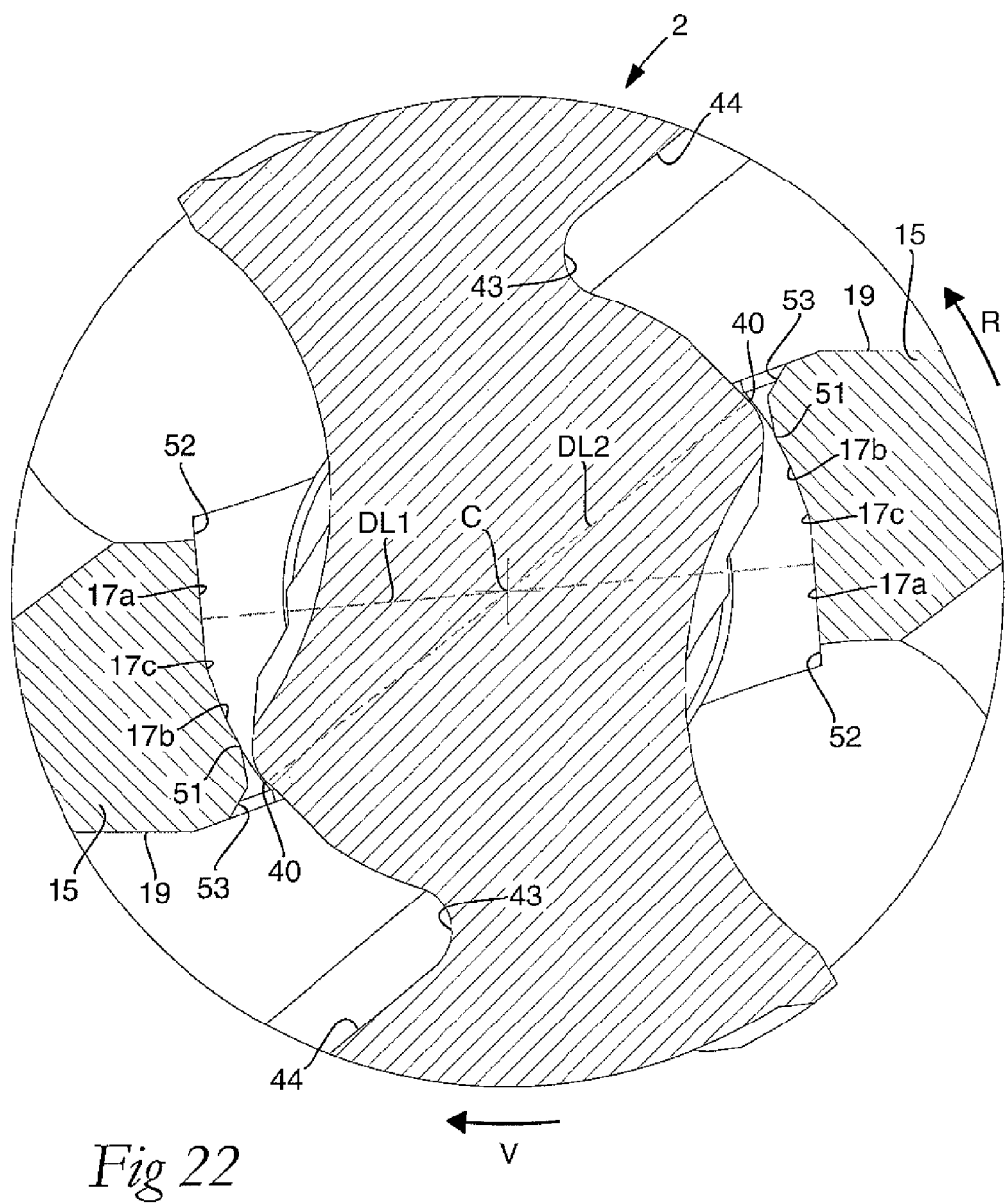
FIG. 22 is a cross section showing the loose top according to FIG. 21 in an initial position before turning-in into the jaw of the basic body.
Figure 23:
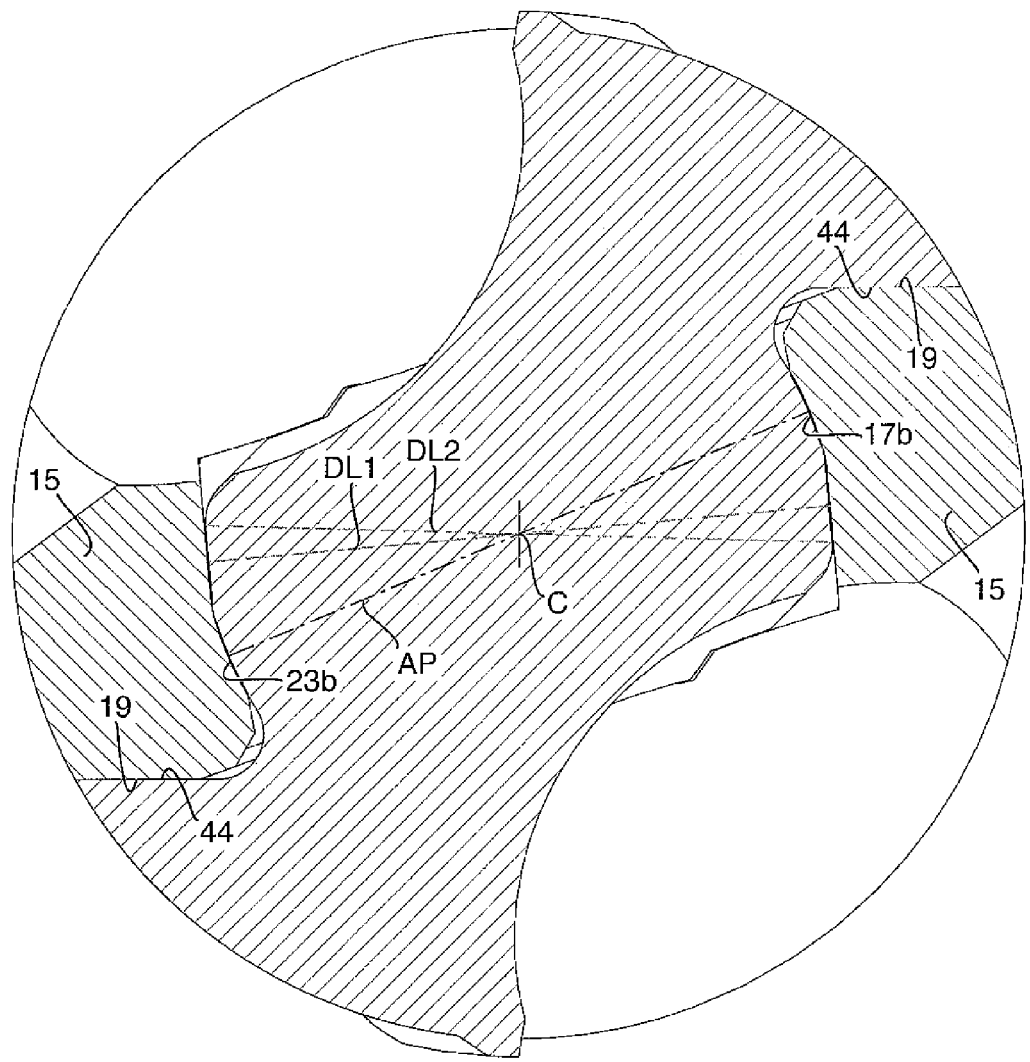
FIG. 23 is a cross section showing the loose top according to FIG. 21 in its turned-in, operative position.

Reference is now made to FIGS. 21-23, which illustrate an alternative embodiment in which the inner support surface 17 of each individual branch 15 is formed with a plurality of part surfaces or surface sections 17a, 17b and 17c. The first surface section 17a extends between the rotationally trailing borderline 52 and the surface section 17c, which is a concave radius transition to the second surface section 17b, which in turn connects to the borderline 51. Via a transition surface 53 that includes three facet surfaces, the surface section 17b transforms into the tangential support surface 19. In the embodiment shown, the surface section 17b has a concave, more precisely part-cylindrical shape, while the surface section 17a is plane, or possibly slightly cambered.

Axially behind the inner support surface 17 there is, in the same way as in the previous embodiment, a cylindrical or otherwise rotationally symmetrical guide surface 48 that is included in a thickened, rear portion of the branch 15, and is separated from the inner support surface 17 via an intermediate surface 49.

In analogy with the inner support surface, the cooperating side contact surface 23 of the loose top 2 includes two surface sections 23a, 23b, the first surface section 23a of which is rotationally trailing in relation to the second surface section 23b. The surface section 23a extends between a borderline 23c to the surface section 23b and between the edge 40 that forms a transition to the rotationally trailing part surface 41. The surface section 23b is convex and has the same rotationally symmetrical shape as the concave surface section 17b of the branch 15. In certain embodiments, the surface section 23b has a cylindrical shape. Via the borderline 35, the surface section 23b transforms into the recess surface 43, which in turn transforms into the tangential contact surface 44. The surface section 23a is plane, or slightly cambered, like the surface section 17a included in the inner support surface 17. Axially behind the two surface sections 23a, 23b, there is a convex, cylindrical or otherwise rotationally symmetrical guide surface for cooperation with the concave guide surface 48.

In FIG. 22, the loose top 2 is shown in an initial position before turning-in (P1) into the jaw between the branches 15, which is similar to the position of the first embodiment shown in FIG. 13. The two plane surface sections 17a that are included in the two inner support surfaces of the branches are mutually parallel. A diametrical line DL1 that intersects the center axis C and is perpendicular to the surface sections 17a represents the shortest distance between the surface sections 17a. Said diametrical line DL1 contacts the surface sections 17a in points that are situated between their side limitations 17c and 52, respectively. DL2 designates a second diametrical line that extends between the edges 40 along the surface sections 23a that are included in the two opposite side contact surfaces 23 of the loose top. The second diametrical line DL2 is some hundredths of a millimeter longer than the first diametrical line DL1. However, the radial distance between the center axis C and the edge 40 that forms an end of the diametrical line DL2 is somewhat smaller than the radial distance between the center axis C and the concave surface section 17b. This means that the edges 40 of the loose top will clear the concave surface sections 17b when the turning-in of the loose top is started.

When the loose top 2 is turned in from its initial position (P1) according to FIG. 22 to the operative end position (P4) according to FIG. 23, the following occurs. Initially, the edges 40 will freely pass the surface sections 17b without affecting the branches 15. When the edges 40 have passed the radius transitions 17c, the edges 40 will contact the surface sections 17a and successively start to bend out the branches. When the pair of edges 40 reaches the rotation angle position in which the diametrical lines DL1 and DL2 coincide with each other, which is similar to position P3 in FIG. 15 of the first embodiment, the deflection and thereby the spring forces becomes maximal, as a dead position is passed. In this state, the convex surface section 23b of the loose top has started to overlap the concave surface section 17b of the inside of the individual branch 15. From said dead position, the turning-in of the loose top continues primarily by the spring force in the branches up to the operative end position, which is shown in FIG. 23 and in which the tangential contact surfaces 44 of the loose top have been pressed against the tangential support surfaces 19 of the branches. In the final stage of the turning-in, which includes turning-in between the dead position and the end position, the convex surface sections 23b of the loose top will be located opposite the concave surface sections 17b. The spring force in the branches will be transferred to the loose top by surface contact between the surface sections 17b and 23b. Simultaneously, the plane surface sections 17a clear somewhat from the internal, plane surface sections 23a of the loose top. In other words, the fastening force that the branches exert will be located along an axial plane AP that extends diametrically between the surface pairs 17b, 23b according to FIG. 23.

The embodiment according to FIGS. 21-23 includes an alternative type of axial locking element for the loose top that includes two seats 54 formed in the rear ends of the branches 15 and two male members 55 on the loose top. The seat 54 is, in this embodiment, a chute that is recessed in the individual branch 15 and situated between tangential support surface 19 thereof and the axial support surface 16 of the basic body. The individual male member 55 is in turn a ridge that is situated axially behind the tangential contact surface 44 of the loose top and connects to the axial contact surface 11. In other words, the ridge 55 projects laterally in relation to the tangential contact surface 44, the rear part thereof transforming into the axial contact surface 11. When the loose top is turned into its operative position, the ridges 55 engage the chutes 54 without the ridges getting surface contact with the chutes. The ridges 55 are therefore activated only if the negative axial forces on the loose top overcome the spring force in the branches.

Further, the side contact surfaces of the loose top do not necessarily need to be plane. For instance, the side contact surfaces may be slightly cambered or markedly convex and arranged to cooperate with inner support surfaces that have been given a more or less markedly concave shape.

Although described in connection with preferred embodiments thereof, it will be appreciated by those skilled in the art that additions, deletions, modifications, and substitutions not specifically described may be made without departure from the spirit and scope of the invention as defined in the appended claims.

The invention claimed is:

1. Drilling tool for chip removing machining, comprising:
a basic body having front and rear ends, between which a first center axis extends around which the basic body is rotatable in a given direction of rotation, and
a loose top having front and rear ends, between which a second center axis extends, the front end of the loose top including one or more cutting edges,
wherein the front end of the basic body comprises a jaw between two axially protruding, peripherally situated branches that are elastically bendable, the branches are capable of resiliently clamping the loose top in the jaw by inner support surfaces of the branches being resiliently pressed against external side contact surfaces of the loose top, and capable of transferring torque to the loose top via tangential support surfaces of the branches and cooperating tangential contact surfaces of the loose top,
wherein the inner support surface of each of the individual branches extends between first and second tangentially separated side borderlines, the first tangentially separated side borderline is heading and the second tangentially separated side borderline is trailing during rotation of the tool,
wherein each external side contact surface of the loose top extends between first and second side borderlines, the second side borderline rotationally trailing the first side borderline and is included in an edge to a trailing part surface, besides which the loose top is axially insertable into the jaw and turnable into and out of an operative engagement with the branches,
wherein a second imaginary diametrical line, which extends perpendicular to the second center axis of the loose top between abutting edges that abut the second side borderline of each of the external side contact surfaces, has a length that is greater than the length of an analogous first diametrical line, which extends a shortest possible distance between the inner support surfaces when the branches are unloaded, and has opposite end points located at tangential distances from the first tangentially separated side borderline and the second tangentially separated side borderline of the respective inner support surface in such a way that upon a turning-in operation of the loose top into engagement with the branches a successively increasing deflection of the branches is provided by the edges up to a predetermined intermediate position of maximum clamping force, so as to then decrease during the continued turning of the loose top until an end position is reached, and during the final phase of the rotary motion between the intermediate position and the end position, the clamping force in the branches assists in bringing the loose top to the end position.

2. The drilling tool according to claim 1, wherein a first, shortest diametrical line between the inner support surfaces of the branches has end points located nearer the second tangentially separated side borderlines of the inner support surfaces than the first tangentially separated side borderlines.

3. The drilling tool according to claim 1, wherein the external side contact surfaces of the loose top, via intermediate surfaces, transform into a pair of external guide surfaces being axially behind, which have a rotationally symmetrical shape that is defined by a second imaginary circle, the diameter of which is less than the length of the second diametrical line, and
wherein the branches include a pair of cooperating internal guide surfaces, which are situated axially behind the inner support surfaces, and have a rotationally symmetrical shape that is defined by a first imaginary circle, the diameter of which is greater than the diameter of the second imaginary circle, and smaller than the length of the first diametrical line.

4. The drilling tool according to claim 3, wherein the internal and external guide surfaces are cylindrical and concentric with the first and second center axes of the loose top and of the basic body, respectively.

5. The drilling tool according to claim 1, wherein each external side contact surface of the loose top is at least partially plane and forms an acute angle (β) with said second diametrical line through the loose top, besides which the cooperating inner support surface of the respective branch is plane and capable of providing surface contact between the pairs of side contact surfaces and inner support surfaces.

6. The drilling tool according to claim 1, wherein the individual side contact surface includes two contact surface sections, wherein the first contact surface section is rotationally trailing the second contact surface section and includes said abutting edge, the second contact surface section being cross-sectionally convexly arched in order to cooperate with a concavely arched, second support surface section, which is included in the inner support surface of the individual branch together with a rotationally trailing, first support surface section.

7. The drilling tool according to claim 6, wherein the second contact surface section of the side contact surface of the loose top and the second support surface section of the inner support surface of the branch have a part-cylindrical shape.

8. The drilling tool according to claim 5, wherein the acute angle (β) between the second diametrical line and the individual side contact surface amounts to at most about 88°.

9. The drilling tool according to claim 5, wherein the acute angle (β) amounts to at least about 75°.

10. The drilling tool according to claim 5, wherein the acute angle (β) is from about 80° to about 86°.

11. The drilling tool according to claim 5, wherein the external side contact surfaces of the loose top each diverge at a certain angle of divergence (α) in a direction from the rear end of the loose top toward the front end of the loose top.

12. The drilling tool according to claim 11, wherein the angle of divergence (α) amounts to at least about 0.20°.

13. The drilling tool according to claim 11, wherein the angle of divergence (α) amounts to at most about 3°.

14. The drilling tool according to claim 11, wherein the angle of divergence (α) is from about 0.60° to about 1.20°.

15. The drilling tool according to claim 1, wherein the inner support surfaces of the branches run parallel to each other and to the first center axis of the basic body when the branches are unloaded.

16. The drilling tool according to claim 1, wherein the abutting edge along each external side contact surface of the loose top is straight.

17. The drilling tool according to claim 1, wherein the individual abutting edge along each side contact surface is in the form of a radius transition between the side contact surface and a trailing part surface.

18. The drilling tool according to claim 1, wherein each external side contact surface of the loose top and the trailing part surface, which meets the side contact surface along the abutting edge, form an obtuse angle (γ) with each other.

19. The drilling tool according to claim 1, wherein the external side contact surfaces extend rearward from at least one clearance surface that is included in the front end of the loose top and rotationally trails one of the cutting edges.

20. The drilling tool according to claim 1, wherein the basic body and the loose top comprise cooperating locking elements in order to counteract unintentional axial retraction of the loose top out of the jaw.

21. The drilling tool according to claim 20, wherein the locking elements include a seat, which is recessed in a rear end of the individual branch and into which a male member situated adjacent to an axial contact surface of the loose top is insertable.

22. The drilling tool according to claim 21, wherein the seat is a chute situated behind the tangential support surface of the branch, and the male member is a ridge situated behind a tangential contact surface of the loose top.

23. The drilling tool according to claim 1, wherein the rear end of the loose top is plane and without a centering pin.

* * * * *